March 2, 1965 C. L. BAKER 3,171,302
RIVET SETTING MACHINE
Filed Aug. 7, 1962 2 Sheets-Sheet 1

INVENTOR.
COLIN L. BAKER
BY
Ezekiel Wolf, Wolf + Greenfield
ATTORNEYS

March 2, 1965 C. L. BAKER 3,171,302
RIVET SETTING MACHINE

Filed Aug. 7, 1962 2 Sheets-Sheet 2

INVENTOR.
COLIN L. BAKER
BY
*Ezekiel Wolf Wolf + Greenfield*
ATTORNEYS

United States Patent Office 3,171,302
Patented Mar. 2, 1965

3,171,302
RIVET SETTING MACHINE
Colin L. Baker, Waltham, Mass., assignor to Judson L. Thomson Manufacturing Co., Waltham, Mass., a corporation of Massachusetts
Filed Aug. 7, 1962, Ser. No. 215,329
9 Claims. (Cl. 78—48)

This invention relates to machines for setting rivets and screws and has as a principal object the provision of a rivet and screw setting machine which is physically smaller, less costly, and more efficient in operation than other such machines presently available.

It is conventional practice to employ motor driven mechanical actuating mechanisms in rivet setting machines, which merchanisms include such parts as motors, belts, pulleys and cover guards, clutches and clutch tripping devices as well as crank shafts and their linkages, connecting rods and top levers. All of these parts not only are costly and therefore contribute a substantial part to the total cost of such machines, but are also bulky and subject to failure.

In the preferred embodiment of this invention, virtually all of the parts enumerated above are omitted. As one feature of this invention, the motor of the conventional machine is replaced by a solenoid which is connected through a coupling to a fly wheel serving as a bell crank to actuate the plunger that sets the rivet. The relatively great mass of the fly wheel reduces acceleration of the moving parts of the actuating mechanism upon energization of the solenoid and provides a unit for storing energy so that it is available when required at the end of the stroke of the plunger for upsetting the rivet. As another feature of this invention, the length of the stroke of the solenoid armature may be varied to change the energy output of the solenoid and achieve optimum operation when the machine is used to set rivets of different weight. While the solenoid provides the operative force to activate the actuating mechanism to drive the plunger, a spring is employed to return the plunger to its initial position after the rivet is set. As yet another feature of this invention, the spring is connected between the frame and the fly wheel in a manner to provide maximum torque during the initial part of the return stroke to overcome any frictional loads which may be applied to the plunger stem and applies a variable force on the fly wheel opposing operation of the solenoid which force varies nonlinearly with the rotation of the fly wheel at approximately the same rate as does the changing pull of the solenoid on the armature.

These and other obects and features of this invention along with its incident advantages will be better understood and appreciated from the following detailed description of one embodiment thereof, selected for purposes of illustration and shown in the accompanying drawing, in which.

Figure 1:
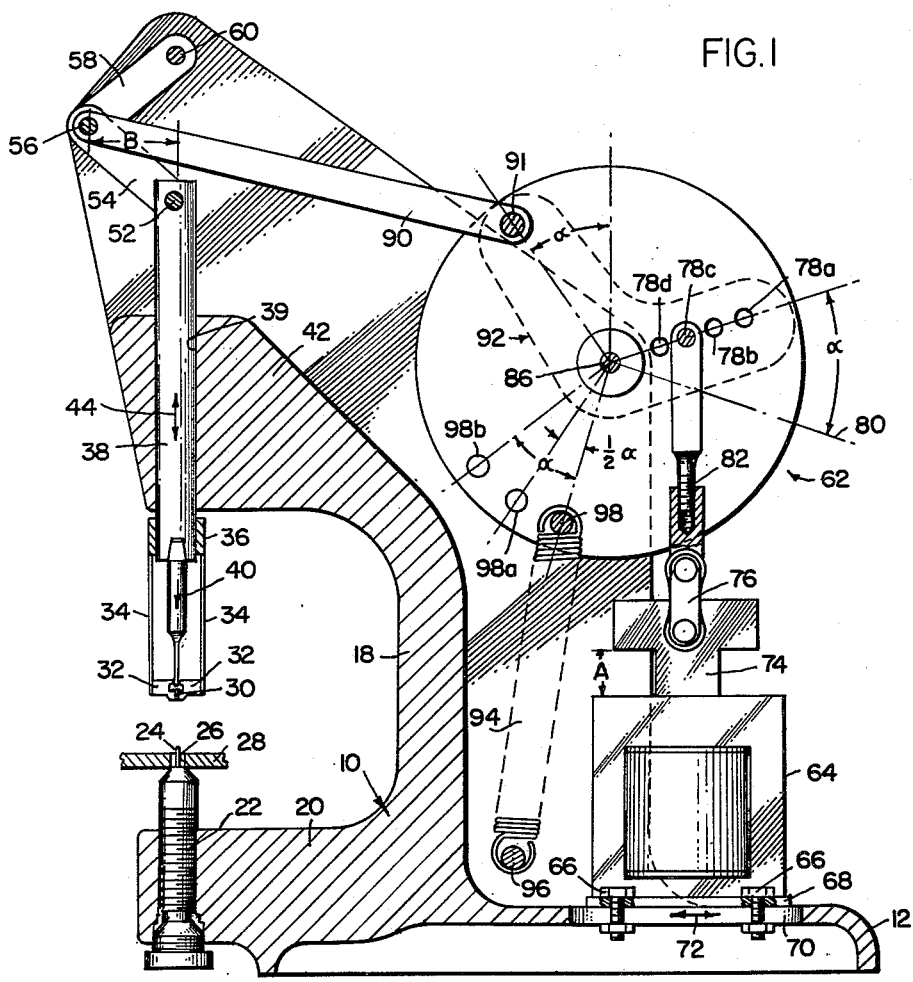
FIG. 1 is a side view of a rivet setting machine constructed in accordance with this invention.

In the following description the machine shown in the drawing will be referred to as a rivet setting machine and its operation will be described in terms of the functions performed while setting rivets. However, it is to be understood that the machine will work equally well and has equivalent application in the setting of screws.

The machine shown in the drawing is organized about a frame 10 having a base 12, side supports 14 and 16 and a forwardly open generally C-shaped front support 18. The C-shaped support 18 includes a lower arm 20 that carries an upwardly extending anvil 22 which in turn carries at its top a pilot 24. The pilot 24 may extend through an opening 26 in the work 28 to receive the rivet to be set by the machine, and the rivet surrounds and is pre-guided by the pilot as it moves through the opening.

In FIG. 1 a rivet 30 is shown held in place by a pair of pockets 32 of standard design in turn carried by a pair of parallel legs 34 depending from a collar 36 which surrounds the lower end of a plunger 38. The plunger 38 carries at its lower end a stem 40 which bears against the top of the rivet 30 and drives it from between the pockets 32 through the opening 26 in the work and serves to transfer to the rivet all of the energy supplied by the plunger. Thus, the upsetting forces applied to the rivet after it is inserted through the opening in the work is transmitted from the plunger to the rivet through the stem.

The plunger is mounted in the upper arm 42 of the front support 18 for reciprocal movement in an axial direction, as suggested by the arrow 44. The collar 36 is frictionally held in place on the lower end of the plunger 38 and thus moves with the plunger as the plunger is actuated. Movement of the collar 36 is however limited by a pair of nuts 46 and 48 threaded onto screw 50 which depends from the side of the arm 42 of the support 18. The nut 46 serves a down limit stop to prevent the collar 36 from moving downwardly with the plunger 38 beyond the distance determined by the position of the nut 46 on the screw 50. Similarly, the nut 48 serves as an up limit stop and prevents the collar from moving upwardly with the plunger 38 above a selected height as determined by the adjustment of the nut on the screw 50. Thus, when the plunger moves down on the support 18, the collar 36, its depending arms 34 and the pockets 32 move with the plunger and hold the rivet 30 in a fixed relative position with respect to the plunger stem 40. This relationship is maintained until the collar 36 strikes the nut 46 at which time downward movement of the pockets 32 ceases, and the stem 40 upon further downward travel of the plunger 38 drives the rivet 30 from the pockets. The same action is experienced when the plunger moves upwardly; that is, the collar 36 moves upwardly with the plunger until the collar engages the nut 48, at which time the stem is withdrawn from between the pockets 32.

The plunger 38 is directly connected by means of pivot pin 52 to a pair of parallel links 54 which in turn are pivotally connected at their upper ends by a floating pin 56 to a second pair of parallel links 58. The upper ends of the links 58 are in turn connected to a fixed pivotal axis on the side supports 14 and 16 as defined by a pin 60. It is clear from an inspection of FIG. 1 that the plunger 38 will move downwardly in the opening 39 in the upper arm 42 of the front support 18 when the links 54 and 58 are aligned vertically with the plunger; that is, when the floating pin 56 joining the links 54 and 58 lies in a vertical plane defined by the pins 52 and 60.

The links 54 and 58 form part of the actuating assembly 62 which transmits energy to the plunger to enable the plunger to position the rivet in the stock and perform the upsetting operations. The source of energy is a solenoid 64 mounted on the base 12 by several anchor bolts 66. In FIG. 1 it is suggested that the bolts 66 not only extend through the frame 68 of the solenoid but through slots 70 (one shown) formed in the base. The bolts 68 and slots 70 disposed on each side of the solenoid 64 permit the solenoid to be moved left or right from the position shown in FIG. 1, as suggested by arrow 72. The armature 74 of the solenoid 64 is drawn downwardly from the position shown in FIG. 1 when the solenoid is energized. The path traveled by the armature upon energization of the solenoid is indicated as distance "A" in FIG. 1.

Figure 3:
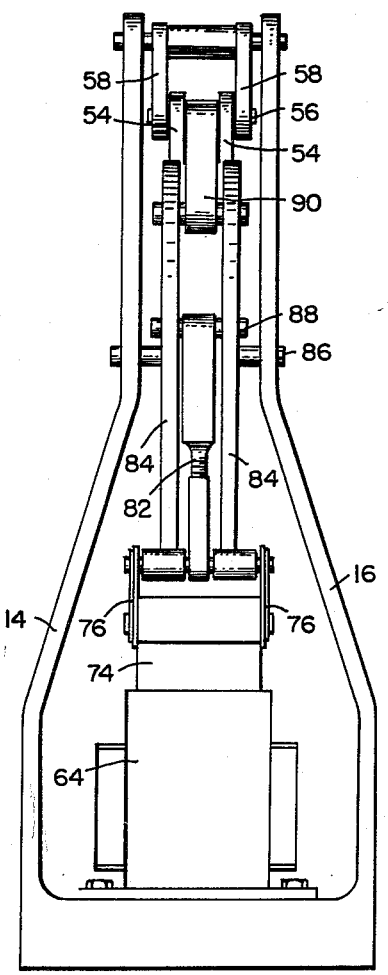
FIG. 3 is a rear view of the machine shown in FIG. 1.

The armature 74 is connected by means of a pair of parallel links 76 and an adjustable coupling 82 to one of several openings 78a, 78b, 78c and 78d in fly wheel 80. The fly wheel 80 is made up of a pair of axially spaced discs 84 rotatably mounted on shaft 86 which extends between the side supports 14 and 16. In FIG. 3 it will be noted that the upper end of the coupling 82 is connected to one of the openings 78a–78d by means of pin 88 extending between the discs 84 of the relatively large mass fly wheel 80. The pin 88 is adapted to connect the upper end of the coupling 82 to any one of the four openings shown. Obviously each of the discs 84 is provided with such openings so that the pin may extend between any one of the aligned pairs.

The fly wheel 80 is connected by a connecting rod 90 to the floating pin 56 joining the pairs of parallel links 54 and 58. Thus, the solenoid 64 through its armature 74, links 76, coupling 82, fly wheel 80, connecting rod 90, floating pin 56, and links 54 and 58 is operatively joined to the plunger 38 to reciprocate it in the opening 39 in the upper arm 42 of the support 18. In FIG. 1 by broken line 92 the fly wheel 80 is suggested to serve as a bell crank between the coupling 82 and the connecting rod 90 to transmit motion from the solenoid to the plunger. While the fly wheel 80 could be replaced by a bell crank to transmit this mechanical motion, numerous advantages flow from the use of the fly wheel, which will be described in detail below.

The rivet setting machine illustrated is completed by a spring 94 connected at its lower end by means of pin 96 to a fixed location on the frame 10 and its upper end by means of pin 98 to the periphery of the fly wheel 80. The spring 94 acts in a direction opposite to that of the solenoid 64 as the axis of the spring 94 and coupling 82 pass on opposite sides of the fly wheel axis 86. Thus, while energization of the solenoid turns the fly wheel clockwise as shown in FIG. 1, de-energization of the solenoid releases the fly wheel 80 to the spring 94 which rotates it in a counter-clockwise direction. That is to say, energization of the solenoid 64 will serve to lower the plunger 38 in the upper arm 42 of the frame member 18 while the spring 94 acts in tension to elevate the plunger 38.

Figure 2:
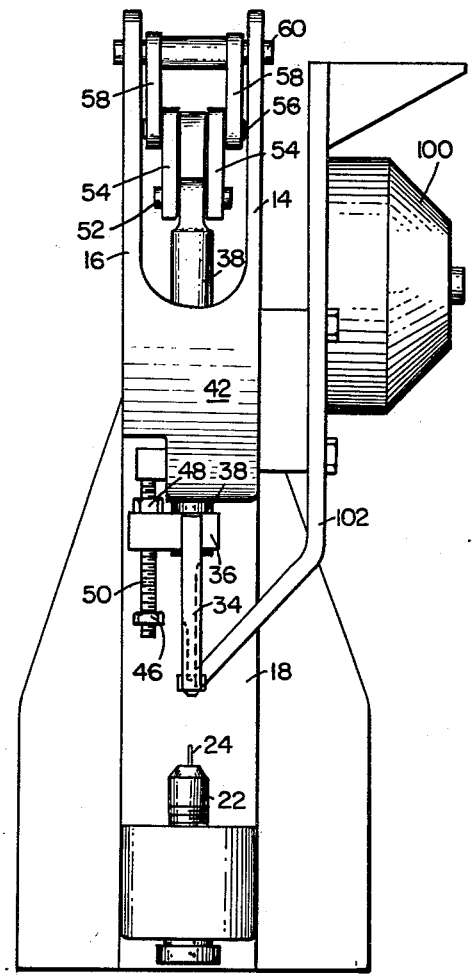
FIG. 2 is a front view of the machine shown in FIG. 1 with a rivet feeding mechanism juxtaposed to the assembly.

In FIG. 2 a rivet hopper 100 is shown secured to the frame 10 and includes a downwardly extending rivet feed chute 102 that terminates at the pockets 32 which support each rivet in position to be set by the machine. The hopper and feed chute form no part of this invention but are shown in FIG. 2 merely to suggest the conventional method of directing rivets to the pockets rapidly so that the machine in turn may rapidly set the rivets in the work.

In the foregoing description the various components of the rivet setting machine have been described. In operation the machine functions as follows: The hopper 100 is filled with rivets, and they are fed at the desired rate to the pair of pockets 32 carried by the collar 36 mounted on the plunger. Either manually or automatically the work on which the rivet 30 is to be mounted is fed over the anvil 22 with the pilot 24 extending upwardly through the opening in the work. A conventional foot control switch (not shown) may be connected in the circuit for energizing the solenoid, and the operator may press the foot pedal to energize the solenoid when the work is in place. Energization of the solenoid causes the armature 74 to pull downwardly through a distance A which turns the fly wheel through an angle $\alpha$. The pin 91 joining the connecting rod 90 to the fly wheel 80 moves through an identical angle $\alpha$ to align the links 54 and 58 by moving the floating pin 56 through a distance "B." As the plunger 38 moves downwardly it carries the collar 36 with it until the collar reaches the stop 46. Continued downward movement of the plunger 38 causes the stem 40 to dissipate the energy imparted to the actuating assembly 62 in upsetting the rivet 30 in the opening 26 in the work 28. When the solenoid 64 is de-energized it releases the fly wheel to the influence of the spring 94 which will turn the fly wheel counter clockwise as viewed in FIG. 1 and thus return the parts of the assembly to the position shown in that figure. When the parts are returned to the position shown another rivet may be deposited by the feed chute 102 in the pockets 32, and the cycle may be repeated.

Certain of the important features of the present invention are not apparent from a mere description of the physical aspects of the machine, and they therefore require amplification. One such feature of the present invention is the adjustment provided for the solenoid and its connection to the fly wheel 80. The energy imparted to the system by the solenoid 64 is a function of the product of the length of the stroke "A" of the solenoid armature and the pounds of pull exerted by the solenoid on the armature. Thus, the energy imparted to the system may be altered by changing the length of the stroke "A" through which the armature moves. The length of the stroke "A" may be increased by moving the solenoid to the right as viewed in FIG. 1 and connecting the coupling 82 by means of the pin 88 to either of the openings 78b or 78a in the fly wheel 80. Similarly, the length of stroke A may be reduced by moving the solenoid to the left as viewed in FIG. 1 and connecting the coupling 82 to the opening 78d. It will be recognized that when heavier rivets are to be set the system may require greater energy and this may be achieved merely by making the adjustment described. By making that adjustment, however, the angle $\alpha$ does not change; that is, the fly wheel 80 turns through the same number of degrees and the connecting rod 90 moves only far enough to move the axis of floating pin 56 through distance "B" to align the links 54 and 58. Thus, varying amounts of energy may be introduced into the system without changing the length of the stroke of the connecting rod 90.

The adjustable coupling 82 enables the operator to move, to the left or right as viewed in FIG. 1, the limits of the distance "B" travelled by the floating pin 56.

As indicated above the fly wheel 80 performs the function of a bell crank to join the coupling 82 and the connecting rod 90. However, the fly wheel 80 has many advantages over a bell crank and makes it possible to employ the relatively weak energy source in the form of a solenoid. First, the greater mass of the fly wheel reduces the acceleration of the several moving parts so as to reduce the shock on the several components and avoid disturbing the rivets in the pockets as the plunger begins its downward travel. More important, however, the fly wheel serves to store energy which is needed only in quantity at the end of the stroke of the plunger. That is, appreciable energy is not required to move the plunger downwardly to a point where the rivet 30 enters the opening 26 in the work. However, a substantial energy requirement exists at the end of the stroke for upsetting the rivet after it has been disposed in the opening in the work. The energy imparted to the flywheel is stored as kinetic energy which is released as the flywheel comes to rest at the end of the downward stroke of the plunger.

Figure 4:
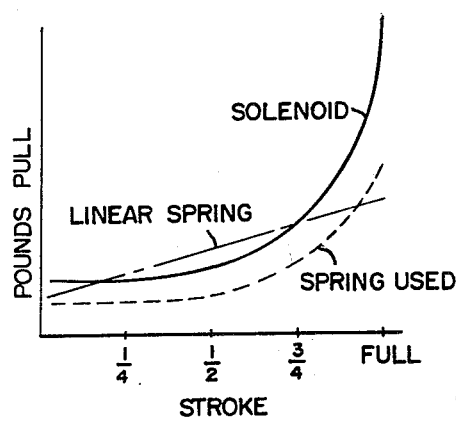
FIG. 4 is a graph showing certain characteristics of the action of the solenoid and spring as used in this invention.

The manner in which the spring 94 is connected between the frame 10 and the flywheel causes the spring to exert a nonlinear force on the system, which force increases more rapidly toward the end of the downward stroke of the plunger, similar to the characteristic of the pull of the solenoid on the armature through the stroke. On the return stroke the spring exerts a maximum torque on the flywheel at the initial stages of the return which torque may overcome any binding or other initial impediment to the upward movement of the plunger. In FIG. 4 certain of these characteristics of the spring 94 are illustrated. In that figure the pounds of pull exerted by the solenoid, spring 94, and a linearly-acting spring are plotted against the stroke of the system. It will be noted in that figure that the pull of the solenoid is substantially constant during about the first half of the stroke and then rises sharply over the second half. If the spring 94 exerted a linear pull on the flywheel throughout the stroke, during a portion of the stroke the pull of the spring may exceed that of the solenoid, so that the system would be rendered inoperative. That is, the solenoid would not be able to overcome the pull of the spring during the intermediate portion of the stroke. By connecting the spring 94 in a manner such that during the first half of the stroke its length increases only slightly but increases at a much greater rate during the second half, a nonlinear pull is exerted by the spring on the fly wheel which may be represented by the broken line in FIG. 4. It will be noted that the pounds of pull exerted by the spring during the stroke changes at substantially the same rate as the pounds of pull exerted by the solenoid, and the pull of the spring is always less somewhat than the pull of the solenoid. Therefore, the solenoid is always able to overcome the pull exerted by the spring and the system will not stall. While the spring 94 exerts a pull bearing a linear relationship with spring elongation, the manner in which the spring 94 is connected avoids a linear relationship between stroke and elongation. This feature is also illustrated in FIG. 1 wherein the increase in length of spring 94 during the first half of the stroke when the axis of pin 98 moves to point 98a is only slight, but during the second half of the stroke when the axis of pin 98 moves to point 98b considerable elongation is experienced.

An inspection of FIG. 1 also reveals that the torque exerted by the spring on the fly wheel sharply rises as the fly wheel turns. Obviously as the pin 98 moves to the position 98a the torque arm is appreciably greater than the torque arm when the spring is in the position shown in FIG. 1. Similarly, the torque arm is increased a substantial additional amount when the center of pin 98 moves from the position 98a to 98b. Thus, the substantially greater torque exerted by the spring on the fly wheel is available at the very beginning of the return stroke when greater forces may be required to overcome any frictional load applied to the plunger and its stem.

From the foregoing description it will be appreciated that by the present invention a greatly simplified and less expensive machine is provided which performs all of the functions of its more complex and expensive predecessors. While but one embodiment of the present invention is illustrated and described, other embodiments will occur to those skilled in the art, in the light of the teachings set forth herein. Therefore, it is not intended that the breadth of this invention be limited to the specific embodiment illustrated and described. Rather, it is intended that the scope of this invention be determined by the appended claims and their equivalents.

What is claimed is:

1. A rivet setting machine comprising
means for holding a rivet to be set by the machine,
means including a plunger disposed above the rivet for moving the rivet and transmitting energy to it for upsetting it after it has been positioned,
a pair of foldable links connected at one end to the plunger and to a fixed pivot at the other end,
a connecting rod connected to the fold of the links and adapted to straighten the links to drive the plunger,
a fly wheel having its periphery secured to the connecting rod, which when rotated actuates the connecting rod to straighten the links,
a solenoid having an armature connected to the flywheel for turning the flywheel when the solenoid is energized,
means for increasing and decreasing the length of the stroke of the solenoid armature without altering the angle through which the flywheel turns upon energization of the solenoid,
and a spring connected to the flywheel and exerting a pull against the wheel in a direction opposite to that of the armature which pull increases in substantially the same relationship with the stroke as the pull of the solenoid on the armature.

2. In a rivet setting machine having a rivet holding means and plunger; actuating means comprising
a flywheel,
working means including a movable member and means for pulling the member through a distance and with the movable member secured to the flywheel for turning it through a fixed angle and storing energy in the flywheel in response to operation of the pulling member,
means for adjusting the working means for changing the distance through which the movable member moves enabling the amount of energy stored in the flywheel to be varied while turning it through said fixed angle,
and means connected between the flywheel and the plunger for imparting a fixed stroke length to the plunger while transmitting to it a variable amount of energy.

3. In a rivet setting machine as defined in claim 2, said actuating means including
spring means connected to the flywheel and exerting a pull on the wheel bearing substantially the same relationship to the stroke as the pull exerted by the working means bears to said stroke.

4. In a rivet setting machine as defined in claim 2, said working means including
a solenoid as a pulling member and an armature as a movable member, and means connecting the armature to the flywheel enabling the distance through which the armature moves to be varied.

5. In a rivet setting machine, actuating means comprising
a flywheel mounted for rotation about its axis,
a solenoid and armature disposed adjacent the flywheel,
a coupling connecting the armature to the flywheel some distance from the flywheel axis,
means for varying the distance of the connection between the coupling and the flywheel from the flywheel axis and altering the position of the solenoid for changing the length of the stroke of the solenoid armature without changing the angle through which the flywheel moves upon energization of the armature,
and a connecting rod connected to a fixed point on the flywheel a selected distance from the flywheel axis for transferring energy to a rivet from the actuating means.

6. A rivet setting machine comprising
means for holding rivets to be set by the machine,
a plunger for driving the rivets from the holding means,
energy storage means connected to the plunger for imparting energy to the plunger as required in the rivet setting operation,
a solenoid and armature connected to the energy storage means for imparting energy to said storage means,
spring means secured to the energy storage means and exerting a pull on said storage means bearing a functional relationship to the stroke of the solenoid armature substantially the same as the functional relationship between the pull on the armature by the solenoid during said stroke.

7. In a rivet setting machine, actuating means comprising
a linking member mounted for pivotal movement about a fixed axis,
a solenoid and armature disposed adjacent the linking member,
a coupling connecting the armature to the linking member some distance from the linking member axis,
means for varying the distance of the connection between the coupling and the linking member from the linking member axis and altering the position of the solenoid for changing the length of the stroke of the solenoid armature without changing the angle through which the linking member moves upon energization of the armature, and a connecting rod connected to a fixed point on the linking member a selected distance from the linking member axis for transferring energy to a rivet from the actuating means, 8. In a rivet setting machine as defined in claim 7, spring means connected to the linking means and exerting a pull against the linking means in a direction opposite to that of the armature.

9. A rivet setting machine comprising a pocket for holding rivets to be set by the machine, a plunger disposed adjacent the pocket for imparting energy to the rivet to set it, energy storage means connected to the plunger and mounted for pivotal movement about a fixed axis, work means including a movable member and means for pulling the member through a distance and with the movable member secured to the energy storage means for turning it through a fixed angle and storing energy in the energy storage means in response to operation of the pulling member, means for changing the distance through which the movable member moves for adjusting the working means enabling the amount of energy stored in the energy storage means to be varied while turning it through said fixed angle, and means connected between the energy storage means and the plunger for imparting a fixed stroke length to the plunger while transmitting to it a variable amount of energy.

References Cited by the Examiner

UNITED STATES PATENTS

| | | | |
|---|---|---|---|
| 709,167 | 9/02 | Martin | 78—48 |
| 779,427 | 1/05 | Jessop | 78—41 |
| 1,323,714 | 12/19 | Merrick | 78—41 |
| 1,863,199 | 6/32 | Fowler | 78—41 |
| 2,230,518 | 2/41 | Weinhold | 78—48.1 |
| 2,323,016 | 6/43 | Dent | 78—48.1 |
| 3,069,938 | 12/62 | Andrycha | 78—48 |

FOREIGN PATENTS

| | | |
|---|---|---|
| 177,307 | 1/54 | Austria. |
| 678,111 | 8/62 | Great Britain. |

WILLIAM J. STEPHENSON, *Primary Examiner.*

CHARLES W. LANHAM, *Examiner.*